Sept. 28, 1965
J. FISHER
3,209,136
REMOTE CONTROL MOVEMENT SYSTEM INCLUDING A UNIT
FOR VARIABLY POSITIONING A LIGHT SOURCE
DEVICE AND A CONTROLLER THEREFOR
Filed May 28, 1963
4 Sheets-Sheet 1
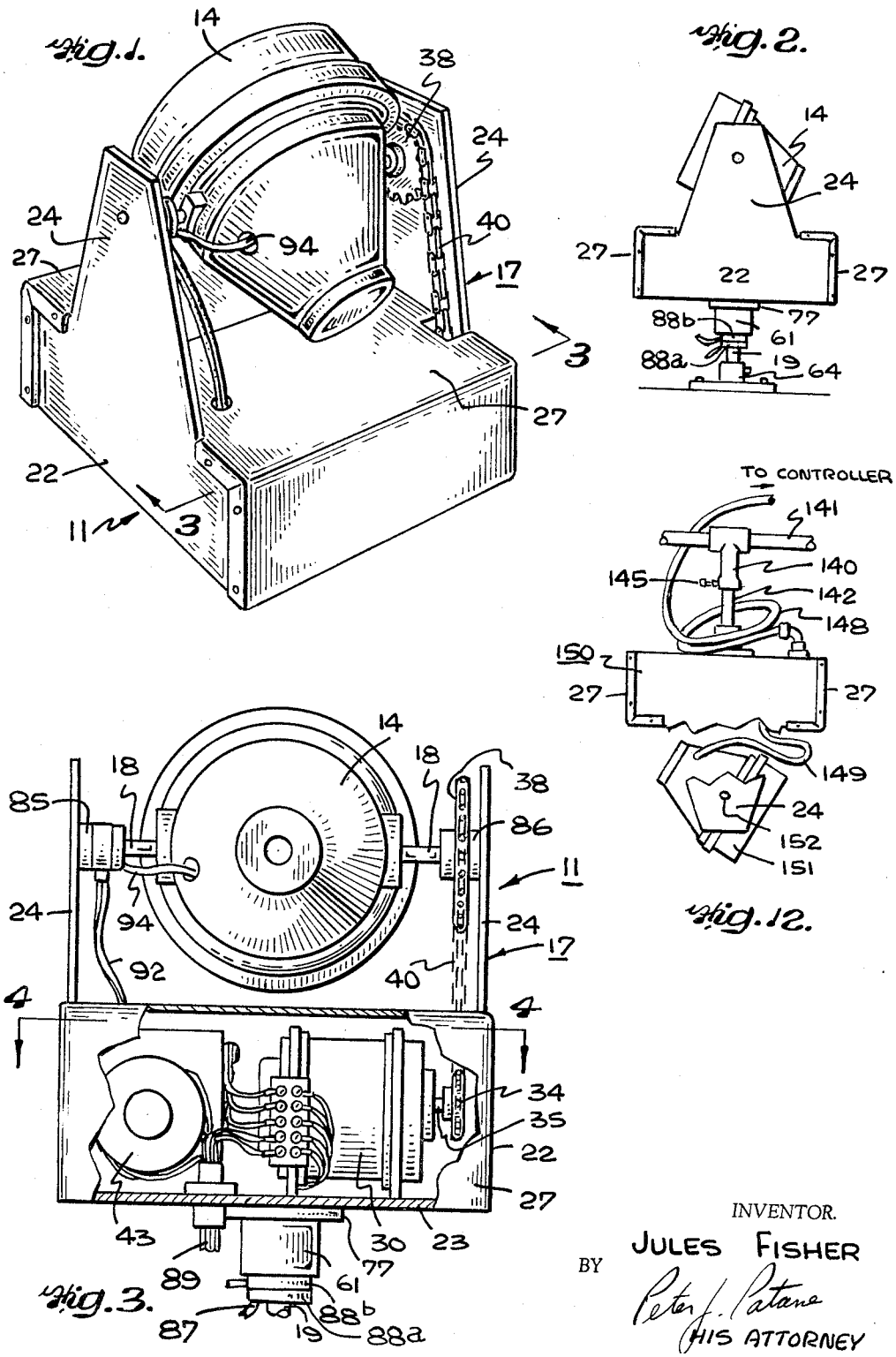
INVENTOR.
JULES FISHER
BY
Peter J. Patane
HIS ATTORNEY

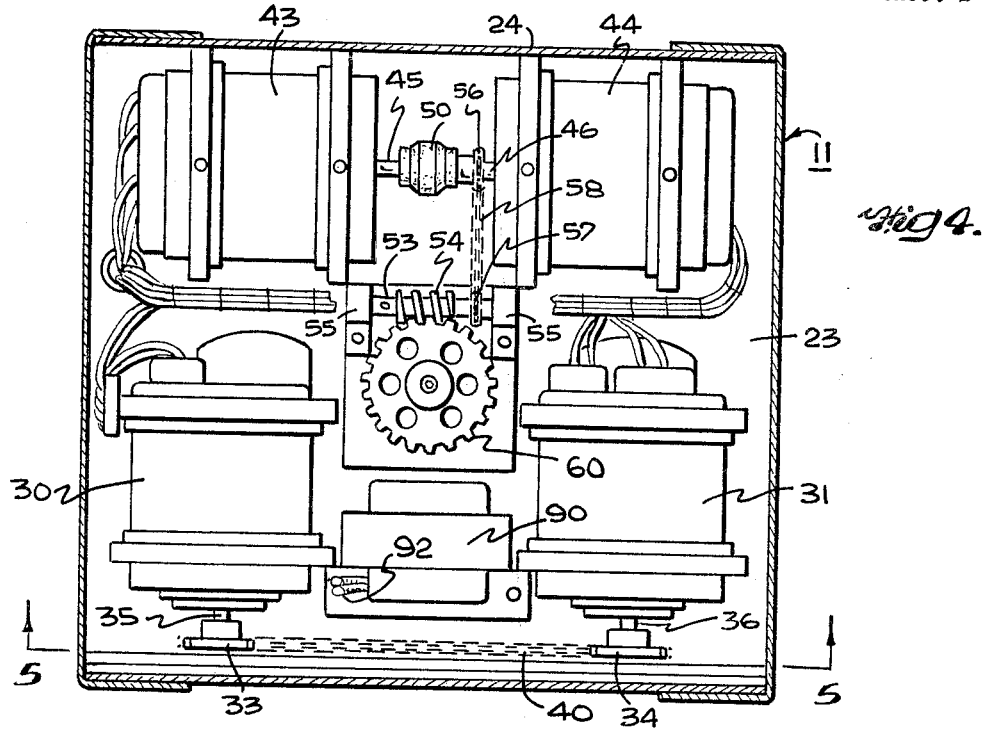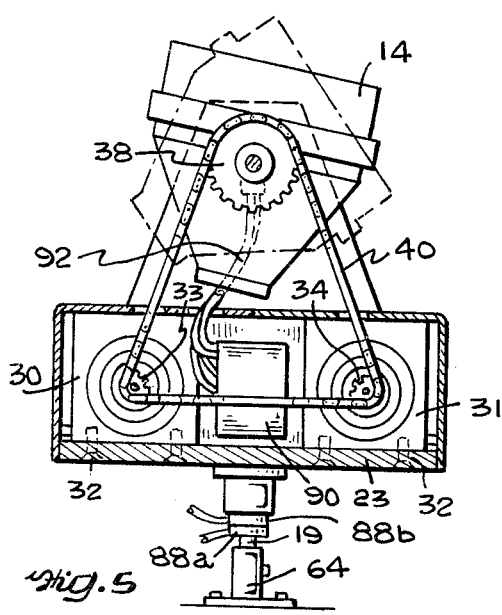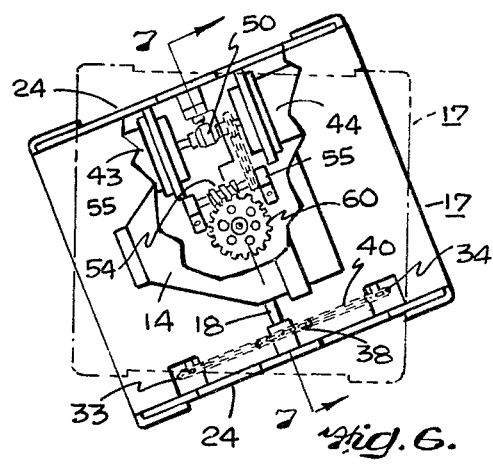

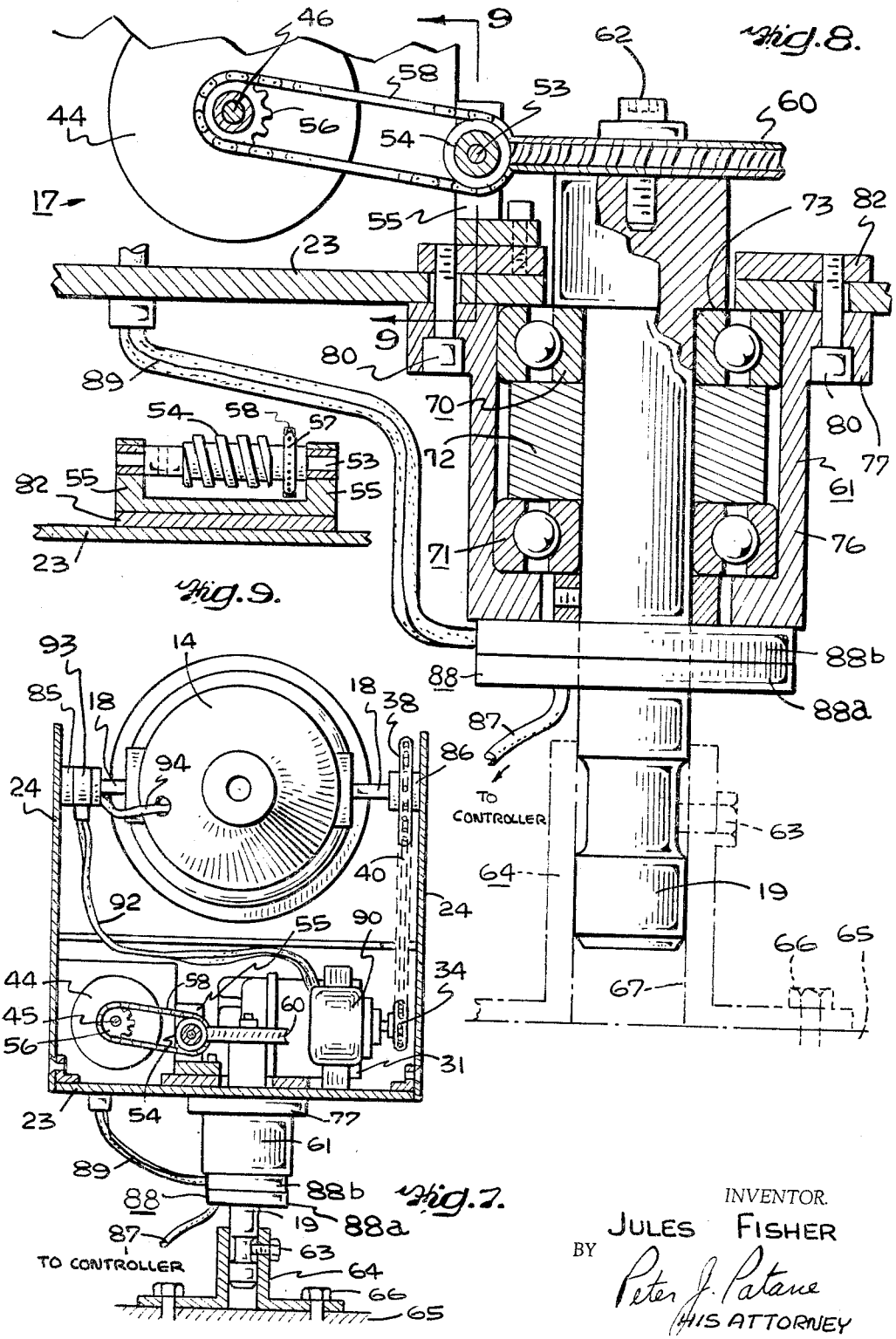

Sept. 28, 1965                    J. FISHER                    3,209,136
           REMOTE CONTROL MOVEMENT SYSTEM INCLUDING A UNIT
              FOR VARIABLY POSITIONING A LIGHT SOURCE
                 DEVICE AND A CONTROLLER THEREFOR
Filed May 28, 1963                                         4 Sheets-Sheet 4
Fig. 10.
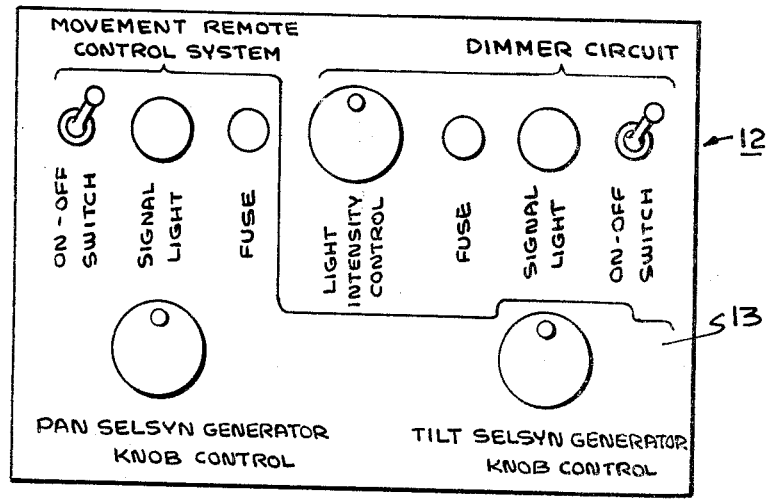
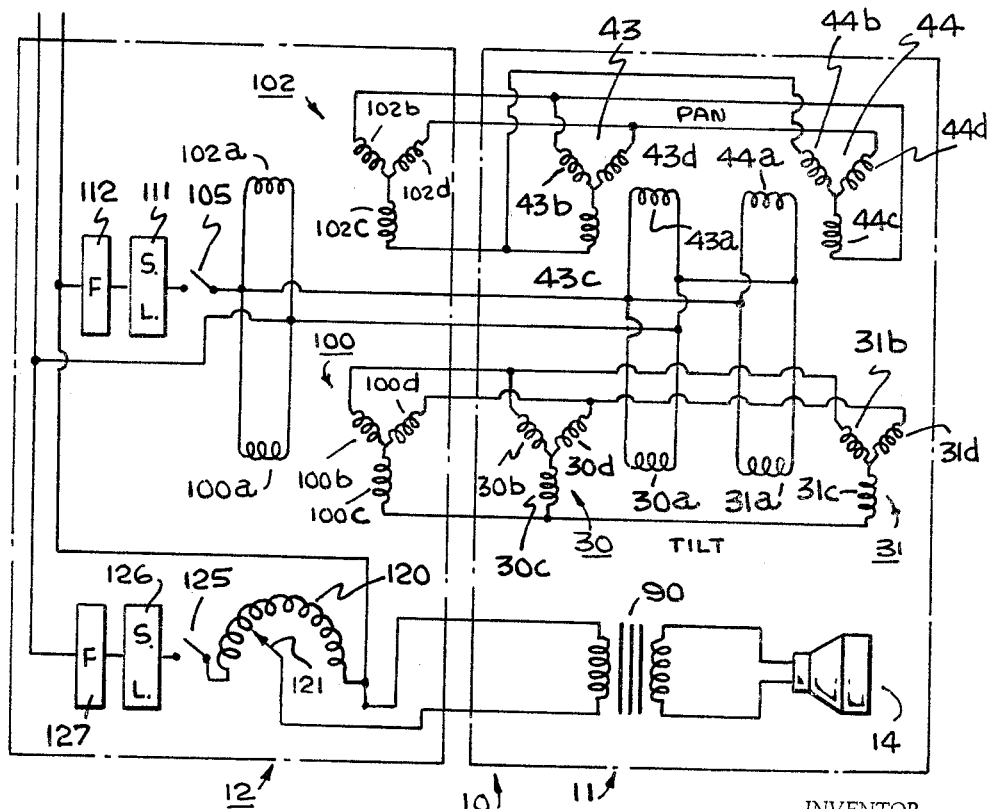
Fig. 11.
INVENTOR.
JULES FISHER
BY Peter J. Patane
HIS ATTORNEY

United States Patent Office 3,209,136
Patented Sept. 28, 1965

3,209,136
REMOTE CONTROL MOVEMENT SYSTEM INCLUDING A UNIT FOR VARIABLY POSITIONING A LIGHT SOURCE DEVICE AND A CONTROLLER THEREFOR
Jules Fisher, 267 E. 10th St., New York, N.Y.
Filed May 28, 1963, Ser. No. 283,798
14 Claims. (Cl. 240—3)

This invention relates to an improved remote control movement system including a unit for variably and continuously positioning a light source device and a controller therefor, the system being intended for use primarily in theaters although it could be used in other fields.

It is an object of this invention to provide an arrangement which is small in physical size so that, for example, the light source unit may be placed in theater locations where (heretofore) variably movable light source units have not been placed because the presently available and known variably movable light source units are large and bulky. With such prior large and bulky variably movable light source units it has not been, for instance, practical to place them near the ceiling of the theater immediately in front of the stage.

Further, the prior art follow spotlights, i.e., movable light source units (because they are placed at a great distance from the stage) often employ an electric arc of high light intensity as the light source, and the use of electric arcs, by local municipal ordinance often requires an attendant to be present for safety reasons. By reducing the size of the unit so that it may be placed close to the stage and by making it remotely controllable, the intensity of the light source may be reduced, thereby permitting the use (as the light source) of a sealed incandescent beam and eliminating the need for an electric arc as the light source. Also, the prior art known follow spotlights that do not use an arc also require an operator next to the spotlight, unlike this invention.

Further, the small size of my remotely controlled unit opens up a vast number of locations and uses not heretofore contemplated, such as locating the unit behind the stage, and in arena theaters, i.e., tent theaters, the unit can be suspended from a pole or the like.

In one embodiment of my invention the unit includes an incandescent light source device whose light intensity is controlled and a support structure or apparatus, for the light source device, movement of the light source device being remotely controlled by a controller. The controller comprises a first control selsyn generator for remotely controlling rotation of the light source device about a horizontal axis and a second control selsyn generator for remotely controlling rotation of the light source device about a vertical axis defined by a vertical, fixed shaft forming part of the support structure. Further, the support structure includes a first pair of selsyn motors electrically connected to the first control selsyn generator and mechanically connected to the light source device for horizontally rotating the latter. Also, the support structure includes a second pair of selsyn motors electrically connected to the second control selsyn generator for rotating the light source device about the vertical axis.

The foregoing and other objects of the invention, the principles of the invention, and the best modes in which I have contemplated applying such principles will more fully appear from the following description and the accompanying drawings in illustration thereof.

In the drawings,

FIG. 1 is a perspective view of the remotely controllable unit comprising the light source device and its support structure;

FIG. 2 is a side elevation of the unit illustrated in FIG. 1 mounted as a foot-light unit;

FIG. 3 is a rear view taken generally along the line 3—3 in FIG. 1 in which an end cover of the support structure has been broken away to show the internal arrangement;

FIG. 4 is a top view taken along the line 4—4 in FIG. 3;

FIG. 5 is a side view taken along the line 5—5 in FIG. 4 illustrating two positions of the light source device;

FIG. 6 is a top view looking down upon the unit illustrated in FIG. 1, part of the light source device and its support structure being cut away to show a portion of the internal arrangement;

FIG. 7 is a view taken along the line 7—7 in FIG. 6 and is partly in section but shows various parts in elevation;

FIG. 8 is an enlargement of the lower, central part of FIG. 7, some of the parts shown in FIG. 7 in elevation being shown in FIG. 8 in cross-section;

FIG. 9 is a sectional view taken along the line 9—9 in FIG. 8 but at a reduced scale;

FIG. 10 diagrammatically illustrates the front panel of the controller;

FIG. 11 is a wiring diagram illustrating the electrical connections within and between the controller and the light unit; and FIG. 12 illustrates a modification of the invention wherein the commutators have been eliminated and the light unit is positioned for use as a overhead light.

Referring to FIG. 11 a remote control movement system 10 is diagrammatically illustrated comprising a light unit 11 and a controller 12. In FIG. 1 there is generally shown, the perspective, the light unit 11 comprising a variably positionable light source device 14 and FIG. 10 illustrates the front panel 13 of the controller 12 for the light unit 11, in FIG. 11 illustrating diagrammatically the electrical connections between and within the light unit 11 and the controller 12, the various parts being described in greater detail hereinafter.

The light device 14 houses a conventional incandescent sealed beam (not illustrated), the light device 14 being carried by a support apparatus or structure 17 for rotatably moving the device 14 about the transverse axes, i.e., the horizontal and vertical axes. The support structure 17 comprises a horizontal rod or shaft 18 and a vertical shaft 19, FIGS. 3, 5 and 7, defining the horizontal and vertical axes aforementioned.

The support structure 17 further comprises housing 22 formed by a bottom horizontal plate 23, two vertical side walls 24, and two L-shaped end covers 27.

The light source device 14 is rotated about the horizontal shaft 18 (FIG. 3) by a pair of tilt synchronous selsyn motors or receivers 30 and 31 (FIG. 4) (suitably fixedly mounted on the bottom plate 23 by screws 32, FIG. 5), through sprockets 33 and 34 mounted on motor shafts 35 and 36 of the selsyn motors 30 and 31, respectively, and a larger sprocket 38 rotatable with and carried by the shaft 18, the sprockets 33, 34 and 38 being connected by a chain 40. As illustrated in FIG. 3, the sprockets 33, 34 and 38 are aligned in a common vertical plane adjacent one of the side walls 24.

Fixed to the bottom plate 23 are two pan synchronous selsyn motors or receivers 43 and 44 having shafts 45 and 46, but the selsyn motors 43 and 44 are positioned so that they share a common longitudinal axis which is at right angles to the longitudinal axes of the shafts 35 and 36, FIG. 4. The shafts 45 and 46 are coupled to each other by a torque transmitting coupling 50 having a central portion (not illustrated in detail) of a material having some resilience, preferably hard rubber. The motors 43 and 44 rotate a shaft 53 about a horizontal axis having a worm gear 54 (the shaft 53 being mounted at its opposite ends in two suitable stationary bearings 55)

through sprockets 56 and 57 mounted on the worm shaft 53 and the motor shaft 46, respectively, and a chain 58 which interconnects them. In turn, the worm gear 54 engages a spur gear 60 of larger diameter, as illustrated in FIGS. 4 and 8, rotatable about the vertical axis of the shaft 19, whereby the horizontal rotary motion of the motor shafts 45 and 46 is used to vertically rotate the entire support structure 17 (except for the shaft 19) at the bearing assembly 61 about the vertical shaft 19, because the gear 60 is fixed to the upper end of the shaft 19, as illustrated in FIG. 8, by a bolt 62 and the lower end of the shaft 19 extends into a hole 67 in a bracket 64 and is held stationary therein by another bolt 63 which extends through a threaded hole in the stationary bracket 64 and which tightly bears against the shaft 19, the bracket 64 is being suitably fixed to the floor 65 by further bolts 66.

The bearing assembly 61 comprises friction reducing bearing elements 70 and 71 spaced from each other by an annular collar 72 and placed on the shaft 19 as illustrated in FIG. 8 below the shoulder 73. The bearing elements 70 and 71 and collar 72 are enclosed by an annular cover 76 having a flange 77 fixed to the bottom plate 23 by bolts 80 which extend slidably through holes in the plate 23 and are threaded into a ring 82. The ring 82 reinforces the opening of the plate 23 through which the shaft 19 extends and also has a sufficiently large surface area to receive the feet of the supports for the worm bearings 55, the latter being secured to the ring 82 by suitable bolts.

As illustrated in FIG. 3, the horizontal shaft 18 for the light source device 14 has opposite ends rotatably carried by the bearings 85 and 86 secured to the side walls 24, the sprocket 38 being on the left side of the bearing 86.

The light unit 10 is connected to the controller 12 by suitable number of electrical wires 87 extending from the controller to a commutator 88, the latter comprising a part 88a rotatable with the shaft 19 and a part 88b rotable with the cover 76. From the commutator part 88b other electrical wires 89 extend through the plate 23 and are connected to the selsyn motors 30, 31, 43, and 44 and a transformer 90 fixedly attached to the plate 23 between the motors 30 and 31 and below the gear 60, as illustrated in FIG. 4, the transformer 90 being in the light circuit of the sealed incandescent beam of the light source device 14. Two of the wires grouped together in the bundle designated 89 are connected to the transformer 90 and from the transformer 90 two other wires 92 extend upwardly through a suitable hole in one of the end covers 27 and are connected to a second commutator 93 having a part rotatable with the shaft 18 and another part fixed to the bearing 85, the wires 92 being connected to the part of the commutator fixed to the bearing 85 and other wires 94 extending from the part of the commutator rotatable with the shaft 18 to the sealed beam within the light source device 14.

From the foregoing it is seen that energization of the motors 43 and 44 rotates the shafts 45 and 46 which rotates the worm gear 54 and thus rotates (about the vertical axis of the vertical shaft 19) the entire support structure 17 except of course, the shaft 19 which is held fixed. Likewise, energization of the motors 30 and 31 rotates the shafts 35 and 36 which rotates the shaft 18 and the light device 14 about the horizontal axis of the shaft 18.

Referring to FIGS. 10 and 11, the selsyn motors 30, 31, 43 and 44 and the sealed incandescent light beam are energized through and controlled by the controller 12 which comprises a front panel 13 on which are mounted knobs 97 and 98 for controlling two control selsyn synchronous generators or transmitters 100 and 102 which are electrically connected to the selsyn motors 30, 31, 43 and 44, as illustrated by the diagram in FIG. 11 the knobs 97 and 98 being used to variably position the rotor windings 100a and 102a (of the generators 100 and 102, respectively), relative to their respective stator windings 100b, 100c and 100d (for generator 100) and stator windings 102b, 102c and 102d (for generator 102).

As further illustrated in FIG. 11 rotor winding 100a is electrically conected to the rotor windings 30a and 31a and the stator windings 100b, 100c and 100d are connected to the stator windings 30b, 30c and 30d and 31b, 31c and 31d. Likewise, rotor winding 102a electrically connected to the rotor windings 43a and 44a and the stator windings 102b, 102c and 102d are connected to the stator windings 43b, 43c and 43d and 44b, 44c and 44d but differently from that illustrated for the stators of generator 100 and motors 30 and 31. That is, the shafts of the motor pair 30 and 31 or the motor pair 43 and 44 must rotate in the same direction when energized but since the shafts of all the motors come out of one end only of the motors and the motors 43 and 44 are positioned facing each other, for the shafts 45 and 46 to rotate in the same direction when they are in tandem facing each other they must rotate in a direction which would be opposite to that of the other if they were placed alongside each other, and the electrical connections of the stators of motors 43 and 44 are arranged to achieve this correct rotation.

Further, an on-off switch 110, a signal light 111 and a fuse 112 are placed in series with the circuit of the motors 30, 31, 43 and 44 and of the generators 100 and 102.

Arranged in electrical parallel with the circuit of the motors 30, 31, 43 and 44 and of the generators 100 and 102 is a dimmer circuit for varying the intensity of the light produced by the sealed incandescent beam. The dimmer circuit comprises a variable transformer 120 controlled by a knob 121 mounted on the control panel 13 and the transformer 90 heretofore mentioned, the transformers 90 and 120 and the sealed incandescent beam being electrically connected as illustrated in FIG. 12. Further, an on-off switch 125, a signal light 126 and a fuse 127 are placed in series in the dimmer circuit, as illustrated, and mounted on the control panel 13.

To move the light unit smoothly and continuously, with the least amount of error, the light unit 11 is statically balanced about the vertical axis of the shaft 19 and, also, the light source device 14 is statically balanced about the axis of the shaft 18, by adding to them, as and where needed, balancing weights. However, to keep the number of weights to a minimum the axes of the shafts 18 and 19 lie in a common vertical plane, as illustrated in FIGS. 2 and 9, and the axis of the shaft 19 intersects the axis of the shaft 18 at approximately midpoint of the latter, as illustrated in FIG. 3.

While a coupling 50 has been illustrated connecting the shafts 45 and 46, it will be understood that a sprocket could also be mounted on the shaft 45 and another sprocket on the adjacent end of the worm shaft 53 and a second chain (in addition to the chain 58) used to connect (by such a two chain arrangement) to the motors 43 and 44 to the worm shaft 53, but this is not illustrated in the drawings.

The embodiment illustrated in FIG. 12 is generally similar to that illustrated in FIGS. 1 to 11, except that it is mounted as an overhead light by being suspended from a bracket 140 carried by a pipe 141, the fixed, vertical shaft 142 (corresponding to the shaft 19 in the embodiment of FIGS. 1 to 11) extending into a hole in the bracket 140 and being secured thereto by a bolt 145. Further, the commutators illustrated in connection with the previous embodiment are omitted and instead a suitable amount of wire is supplied, as illustrated at 148 and 149, to accommodate the contemplated maximum rotation of the light unit 150 about the shaft 142 and the light source device 151 about its horizontal shaft 152.

It is seen from the foregoing that the light source device 14 is variably and smoothly, continuously positionable due to the mechanical connections between the selsyn motors and the electrical connections between the selsyn motors and the selsyn generators as heretofore described and illustrated in the accompanying drawings, and from a remote location due to the selsyn generators, so that the light source may be moved about a horizontal, tilt, axis and a vertical, pan, axis to continuously follow someone during a performance.

Having described this invention, I claim:

1. An improved control system comprising a light source device, support apparatus for said light source device, a controller, said controller comprising a control selsyn generator for remotely controlling rotation of said light source device about one axis, a second control selsyn generator for remotely controlling rotation of said support apparatus about another axis transverse to said first axis, said support apparatus including a fixed shaft, said support apparatus being disposed remote from said controller, said support apparatus including a plate carrying a first selsyn motor mounted separately from said light source device electrically connected to said first mentioned control selsyn generator and mechanically connected to said light source device, and a second selsyn motor also carried by said plate and electrically connected to said second control selsyn generator and mechanically connected to said fixed shaft for rotating said light source device about the axis of said fixed shaft by rotating all of said support apparatus except said fixed shaft about the axis of said fixed shaft.

2. The structure recited in claim 1 wherein a second selsyn motor is mechanically and electrically connected to the first mentioned selsyn motor and both motors are electrically connected to the first control selsyn generator and wherein a second selsyn motor is mechanically and electrically connected to the second mentioned selsyn motor and both motors are electrically connected to the second control selsyn generator.

3. The structure recited in claim 2 wherein the first two mentioned selsyn motors rotate said light source device about said first mentioned axis, said first two mentioned selsyn motors rotating in the same direction but being disposed on opposite sides of said first mentioned axis and side-by-side with each other, the second two mentioned selsyn motors rotate said apparatus about the second mentioned axis, said second two mentioned selsyn motors being disposed in tandem, rotatable in the same direction, and with their longitudinal axes transverse to the longitudinal axes of the first two mentioned selsyn motors.

4. An improved light unit comprising a fixed vertical shaft, a plate rotatable about said shaft, said shaft being carried by said plate, friction reducing means between said plate and said shaft, 2 pan selsyn motors secured to said plate and mechanically connected to said shaft for rotating said plate about said shaft, a light source device, upstanding spaced side walls secured to said plate, a horizontal rod for rotatably mounting said light source device between said side walls, support bearing structure mounting said rod to said side wall, 2 tilt selsyn motors mounted on said plate and mechanically connected to said rod for rotating said light source device, said light source device being statically balanced about said horizontal rod, and the entire unit being statically balanced about said vertical shaft.

5. A light unit comprising a housing defined by a bottom plate and side walls connected thereto, a movable light source device rotatably mounted on said side walls, a shaft extending from said bottom plate, a selsyn motor mounted on said plate and mechanically connected to said shaft for rotating said plate about the longitudinal axis of said shaft, and a second selsyn motor mounted on said plate and mechanically connected to said light source device for rotating the latter about a second axis transverse to that of said shaft.

6. The structure recited in claim 5 wherein the connection between the first selsyn motor and the shaft is formed by a chain and sprocket means, a worm gear rotated by said chain and sprocket means, and a spur gear engaging said worm gear, said spur gear being fixed to the shaft.

7. The structure recited in claim 6 wherein the connection between the second selsyn motor and the light source device is formed by a second chain and sprocket means.

8. The structure recited in claim 5 wherein the first and second transverse axes lie in a common plane and the second transverse axis intersects the first at approximately the midpoint of the latter, said movable light source device being substantially statically balanced about said shaft, said light unit as a whole being substantially statically balanced about said second axis.

9. The structure recited in claim 8 said movable light source device being substantially statically balanced about said shaft, said light unit as a whole being substantially statically balanced about said axis.

10. A combined electrical system for remotely electrically moving a light source device comprising a light unit including said light source device, said light unit including a housing, a remotely positionable controller comprising a generator, said light unit including a pair of selsyn motors both electrically connected to said selsyn generator and controllable thereby, said motors being mounted on said housing, said light source device being pivotally mounted on said housing for movement about a first axis, and means for mechanically connecting said motors to each other and to said light source device to jointly move said light source in the same direction about said first axis, whereby one motor tends to brake the other motor if one motor tends to overtravel to provide smoothness of operation and better control.

11. The structure recited in claim 10 wherein the motors are mounted on opposite sides of the first axis.

12. The structure recited in claim 10 wherein said controller includes a second selsyn generator and said light unit includes a second pair of selsyn motors both electrically connected to said second selsyn generator and controllable thereby, said second pair of motors being also mounted on said housing, a shaft pivotally connected to said housing and defining a second axis transverse to the first mentioned axis about which said housing is movable, and means for mechanically connecting said second pair of motors to each other and to said shaft to jointly move said housing in the same direction about the axis of said shaft, whereby one motor of said second pair of motors tends to brake the other motor if one motor tends to overtravel to provide smoothness of operation and better control.

13. The structure recited in claim 12 wherein the second pair of motors are mounted in tandem and transverse to the first axis.

14. The structure recited in claim 12 wherein said motors are disposed between said shaft and said light source device.

References Cited by the Examiner
UNITED STATES PATENTS

| | | | |
|---|---|---|---|
| 1,827,797 | 10/31 | Muller | 240—61.9 |
| 2,054,224 | 9/36 | Levy | 240—3 |
| 2,097,537 | 11/37 | Snyder | 240—3 |
| 2,293,207 | 8/42 | Haskin et al. | 318—24 |
| 2,768,339 | 10/56 | Gelb | 318—24 |
| 3,064,121 | 11/62 | Greene | 240—123 |
| 3,102,993 | 9/63 | Jensen | 240—7.7 |

NORTON ANSHER, *Primary Examiner.*